United States Patent [19]

Wimpffen

[11] E Re. 29,146

[45] Reissued Mar. 8, 1977

[54] HOUSING FOR COIN OPERATED CONSTRUCTIONS

[75] Inventor: George I. Wimpffen, Wheaton, Ill.

[73] Assignee: Qonaar Corporation, Elk Grove Village, Ill.

[22] Filed: Nov. 28, 1975

[21] Appl. No.: 636,038

Related U.S. Patent Documents

Reissue of:

[64] Patent No.: 3,782,142
Issued: Jan. 1, 1974
Appl. No.: 276,704
Filed: June 31, 1972

[52] U.S. Cl. ..... 70/170; 109/59 R; 292/304

[51] Int. Cl.² ..... E05B 65/52

[58] Field of Search ..... 70/158, 163, 166, 170; 292/300, 304; 109/59; 220/200, 210; 137/371

[56] References Cited

UNITED STATES PATENTS

| | | | |
|---|---|---|---|
| 655,991 | 8/1900 | Ralph | 160/180 |
| 807,253 | 12/1905 | Downs | 308/51 |
| 1,061,552 | 5/1913 | McNerney | 292/304 |
| 1,985,869 | 12/1934 | Millice | 109/59 |
| 2,907,090 | 10/1959 | Gaspardo | 27/8 |

FOREIGN PATENTS OR APPLICATIONS

| | | | |
|---|---|---|---|
| 47,345 | 5/1933 | Denmark | 70/158 |

*Primary Examiner*—Robert L. Wolfe
*Attorney, Agent, or Firm*—McDougall, Hersh & Scott

[57] ABSTRACT

A coin handling construction including a housing provided with a cap for closing access to the interior of the construction. Locking means are provided for securing the cap in place on the housing. These locking means comprise a rotatable rod positioned within the housing. First locking elements are mounted on the cap, and second locking elements are mounted on the housing. The locking elements define a surface for inter-engagement of the elements which prevents separation of the cap and housing. The rod is rotatable between a first position for maintaining the locking element surfaces in the engaged condition, and a second position which frees the cap for separation from the housing.

26 Claims, 11 Drawing Figures

FIG. 1
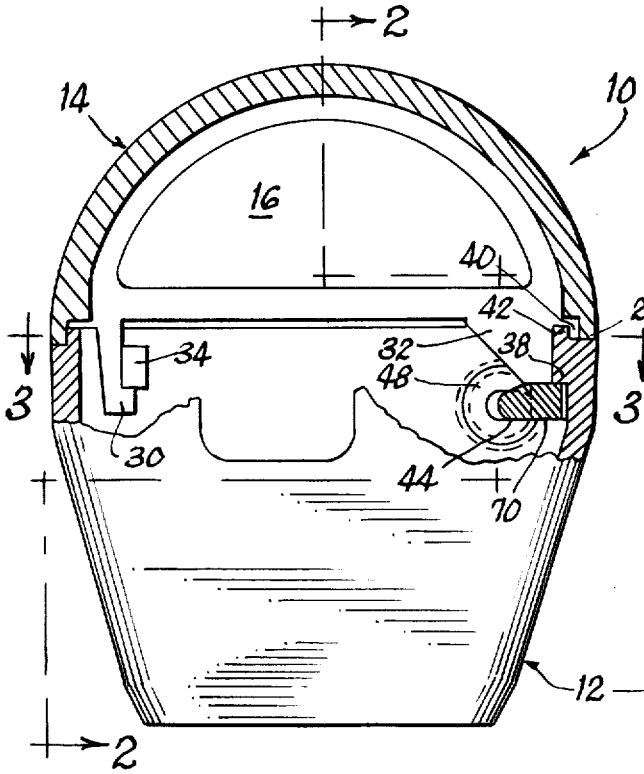
FIG. 2
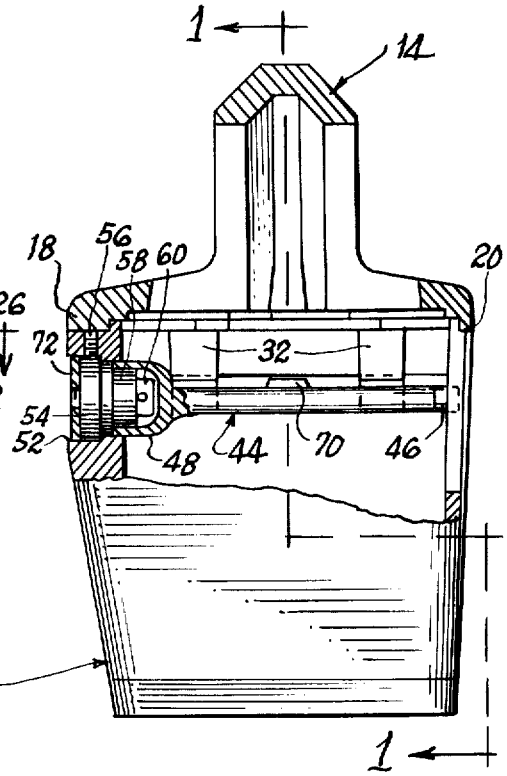
FIG. 3
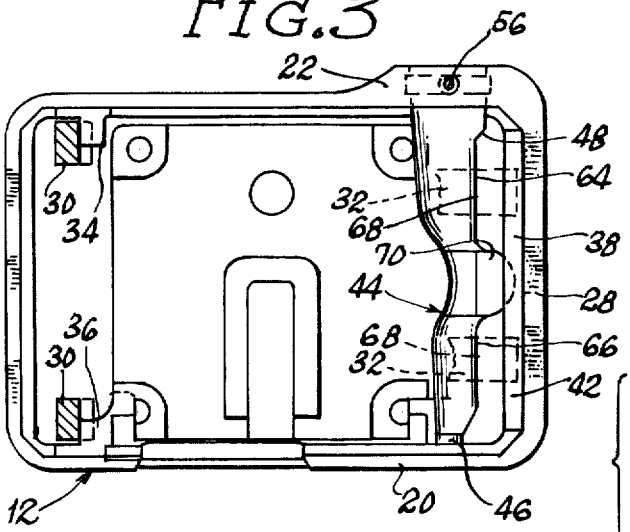
FIG. 4
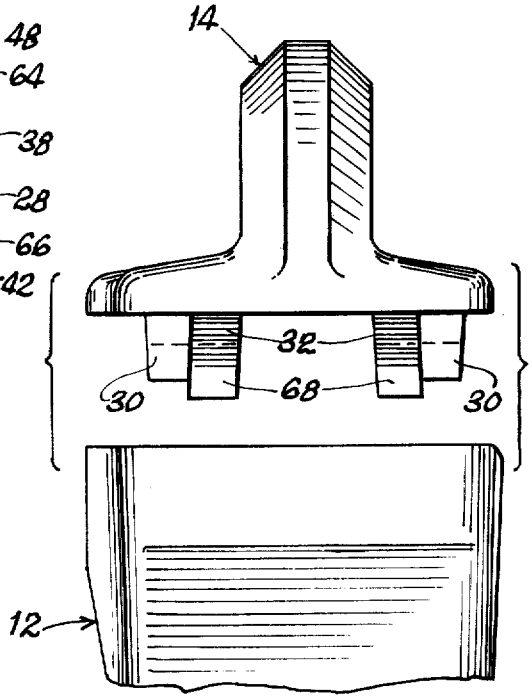
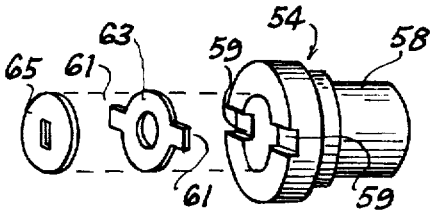
FIG. 2a

HOUSING FOR COIN OPERATED CONSTRUCTIONS

Matter enclosed in heavy brackets [ ] appears in the original patent but forms no part of this reissue specification; matter printed in italics indicates the additions made by reissue.

This invention relates to an improved coin operated construction. The invention is particularly concerned with constructions which require a cap or similar covering means provided for permitting access to the construction. The cap must be secured against unauthorized entry, and the features of the invention are directed to a locking arrangement which accomplishes this.

Coin operated constructions are notoriously subject to theft attempts. In addition, such constructions are very susceptible to vandalism since they are often located in unsupervised areas.

Constructions which accept coins must invariably be provided with some access means whereby the coins can be retrieved or so that repairs and maintenance can be accomplished. Theft attempts and vandalism are typically directed to these access areas.

Parking meters are common objects of theft and vandalism, and the features of this invention will be specifically directed to a description of an improved design for a parking meter housing. It will be understood that in referring to a cap employed in a parking meter, and in referring to an associated housing, reference is intended for various other constructions employing a door or other access means in association with a housing. Thus, the features of the invention can readily be incorporated into other mechanisms subjected to thefts and vandalism, and the appended claims are intended to be of such scope.

It is a general object of this invention to provide an improved housing construction provided with access means which are designed to eliminate or greatly minimize attempts at theft and vandalism.

It is a more specific object of this invention to provide an improved construction including a cap and associated housing wherein the cap can be completely secured against unauthorized entry.

It is a still further object of this invention to provide a cap and housing construction which is uniquely suitable for use in connection with a parking meter or other coin operated construction.

These and other objects of this invention will appear hereinafter, and for purposes of illustration, but not of limitation, specific embodiments of the invention are shown in the accompanying drawings in which:

FIG. 1 is an elevational view, partly in section, of a housing and cap construction characterized by the features of the invention;

FIG. 2 is a view, partly cut away, taken about the line 2—2 of FIG. 1;

FIG. 2a is an exploded view illustrating lock parts utilized in the construction;

FIG. 3 is a horizontal sectional view of the construction taken about the line 3—3 of FIG. 1;

FIG. 4 is a fragmentary, exploded view of the cap and housing;

Figure 5:
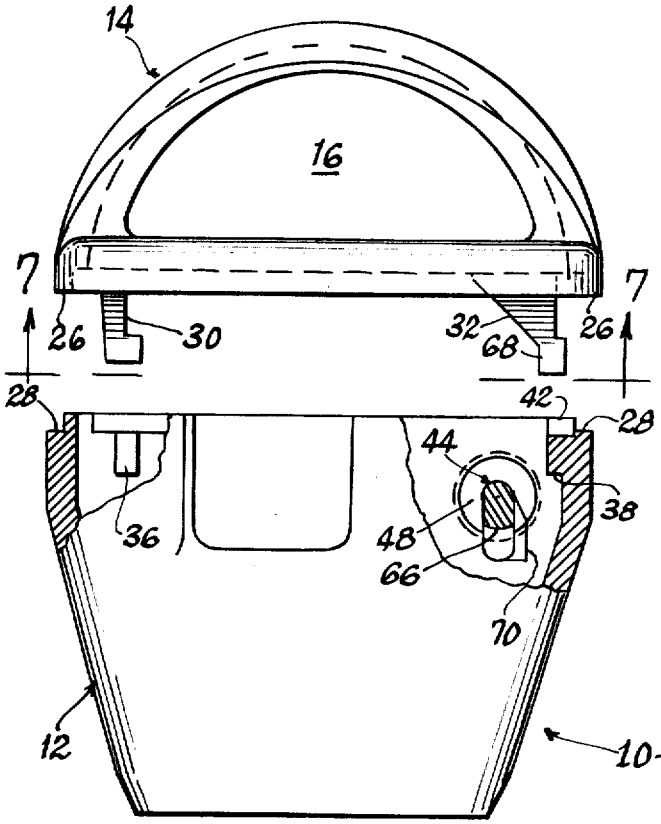
FIG. 5 is an exploded view, partly cut away, of the cap and housing.

This invention relates to a coin handling construction including a housing provided with a closure cap covering access to the interior of the construction. Locking means secure the cap in place on the housing, the locking means including a rotatable rod positioned within the housing. First locking elements are mounted on the cap and second locking elements are mounted on the housing. These locking elements define engaging surfaces, and the rod is movable between a first position for engaging the elements and a second position for releasing the elements whereby the cap can be removed.

The rotatable rod is preferably associated with a lock whereby the rod can be secured in the first position for retaining the locking elements in engagement. The rod is preferably formed as an extension of the lock plug whereby rotation of the lock plug by means of a suitable key serves to control the rod operation.

The lock structure preferably comprises a shield exposed on the exterior of the housing to minimize the the possibility of lock damage due to tampering. The shield is preferably press-fit within an opening which retains the lock. An opening in the shield is provided for passage of a key. The opening may be threaded whereby a special removal tool can be inserted in the opening whereby rotation of the tool serves to drive the shield out of the housing opening thereby permitting access to the lock for maintenance purposes.

The meter construction 10 illustrated in the accompanying drawings comprises a housing 12 and a cap structure 14 adapted to be associated with the housing. In the illustrated embodiment, the housing and cap structure are designed for use in a parking meter with the cap structure defining an upper aperture 16 for retaining viewing windows whereby time purchased can be observed. It will be appreciated that the features of the invention are adaptable to other housing and closure combinations which are to be secured against unauthorized entry.

The cap 14 defines a peripheral flange including a wider flange section 18 extending across the front of the cap and a narrower flange section 20 extending across the back of the cap. Seats 22 and 24 are defined around the periphery of the housing 12 whereby the cap can be located in fitting relationship with the housing. Additional cap flange sections 26 are formed on the sides of the cap, and seats 28 are defined by the housing for engagement with these flange sections.

Pairs of downwardly extending fingers 30 and 32 are formed integrally with the cap body. The housing defines ledges 34 and 36 which are aligned with the fingers 30. A shoulder 38 is formed on the opposite side of the housing for engagement with the fingers 32. The combination of the fingers and elements 34, 36 and 38 constitutes part of a locking arrangement for the cap and housing.

Referring particularly to FIG. 1, it will be noted that a gap is provided at 40 between one flange section 26 and a flange section 42 defined adjacent one seat 28. The gap is dimensioned so that the fingers 30 and 32 can be moved laterally to disengage the fingers relative to the ledges 34 and 36 and the shoulder 38. Accordingly, the cap is located in place relative to the housing by first moving the fingers downwardly and then shifting the cap and fingers laterally into the engaged position.

Figure 6:
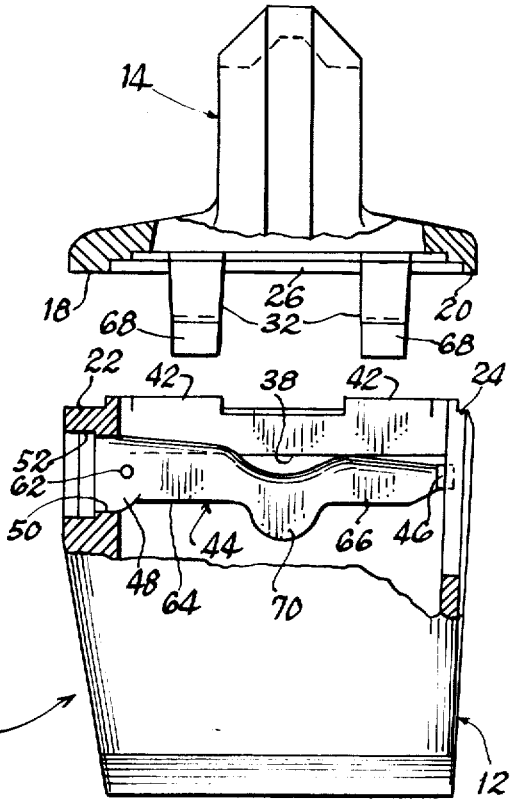
FIG. 6 is a side elevation, partly cut away, of the cap and housing as shown in FIG. 5.
Figure 7:
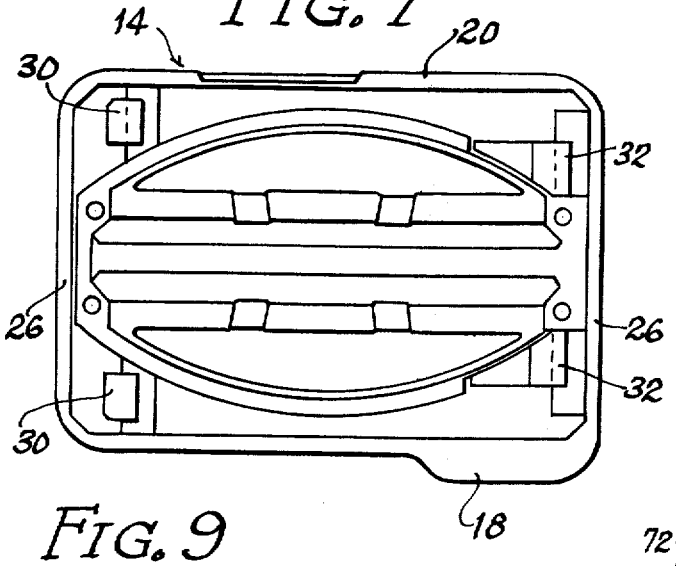
FIG. 7 is a bottom plan view of the cap taken about the line 7—7 of FIG. 5.

A locking rod 44 is mounted for rotation relative to the housing 12. One end 46 of the rod is received in an opening defined by a housing wall, and the hollow end 48 is received in an oppositely disposed opening 50. The opening 50 includes a larger diameter extension 52 (FIG. 6) which communicates with the exterior of the housing. A lock cylinder 54 is received in the opening 50 and extension 52, and the lock cylinder is secured in place by means of a set screw 56. A flat is defined by the lock cylinder whereby the set screws 56 serves to prevent rotation of the lock cylinder once it has been properly positioned. It will be noted that the set screw is covered by the cap when the cap is secured in place so that this structure cannot be tampered with.

A lock plug 60 is rotatable within the lock cylinder. The end of the rod 44 is hollow whereby the end can be fitted around and is movable relative to the cylinder extension 58. A pin 62 serves to secure the plug 60 to the rod whereby the rod will rotate with the plug.

As illustrated in FIG. 2a, the lock cylinder defines a pair of grooves 59 which receive the wings 61 of lock shield 63, the shield resisting penetration of any intrusion except a proper key into the plug positions behind the shield. A rotatable guard disc 65 of the type described in Sollenberger U.S. Pat. No. 3,199,321 is also positioned in the opening defined by this end of the cylinder to resist use of a drill which might be used in an attempt to gain entry to the housing.

The rod 44 comprises an eccentric cross section defining engaging surfaces 64 and 66. When the fingers 32 are moved downwardly from the position shown in FIG. 5, the end portions 68 of these fingers are located opposite the engaging surfaces 64 and 66. The cap can be shifted laterally for engagement of the fingers with the ledges and shoulder, and the rod 44 can then be rotated upon operation of the lock. Alternatively, the lock operation and rod rotation may itself operate to shift the fingers since the surfaces 64 and 66 will engage the finger ends 68.

With the surfaces 64 and 66 in engagement with the fingers, the cap is locked against lateral movement. Because of the engagement of the fingers with the ledges and shoulder, the cap is also locked against any vertical movement; thus, the cap is completely secured unless the rod 44 is rotated to release the fingers.

An enlarged section 70 is defined by the rod 44, and this section is moved beneath the shoulder 38 upon operation of the lock. The enlarged section 70 thus operates to limit rotary movement of the rod whereby the engaging surfaces 64 and 66 will be in proper position when the construction is secured. Thus, the lock plug 60 cannot be operated beyond a position which insures engagement of the locking means.

Attempts to tamper with secured constructions often involve tampering with locks utilized in the constructions. In some instances, this may involve an attempt to drive the lock plug 60 inwardly in an attempt to destroy the lock capability. With the construction of this invention, such attempts would be futile due to the fact that the rod 44 extends between the housing walls 50. Thus, the rod is maintained in a fixed position relative to the housing, and it serves as a barrier to any attempts to move the lock plug inwardly.

Figure 10:
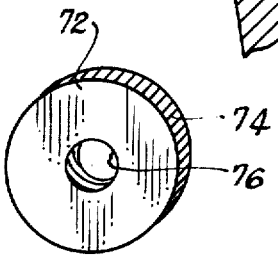

The lock structure illustrated includes a shield 72 in the form of a washer as illustrated in FIG. 10. This shield defines knurled sides 74 whereby the shield can be driven into tight fitting engagement within the opening 52. The central opening 76 of this shield is dimensioned to be just large enough for the entry of an appropriate key. By providing this shield, attempts to tamper with the lock plug 60 can be minimized.

Figure 8:
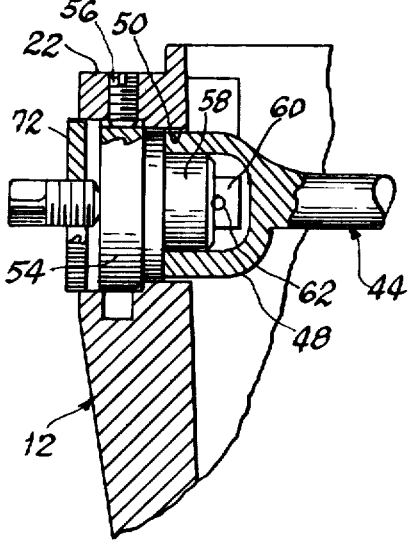
FIG. 8 is an enlarged, fragmentary, sectional view illustrating the lock security arrangements of the invention.
Figure 9:
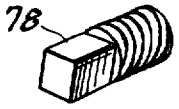
FIG. 9 is a perspective view of a threaded element employed for releasing a lock shield incorporated in the construction; and, FIG. 10 is a perspective view of the lock shield.

The use of a shield does prevent ready access to the lock cylinder for maintenance purposes or for changing of the locks. The illustrated structure provides a means for permitting such access while still maintaining the benefits of the shield. Specifically, the shield is internally threaded whereby a tool such as shown at 78 in FIG. 9 can be employed for removing this shield. As shown in FIG. 8, the tool can be threaded inwardly until the end of the tool engages the lock. Continued rotation then operates to drive the shield outwardly since the lock is restrained against inward movement. In the preferred form of the invention, the threaded opening 76 is painted to hide the appearance of threads. In addition, the threads for the shield and tool are preferably left-hand threads of unconventional pitch whereby standard tools could not be used to gain access to the meter.

It will be understood that various changes and modifications may be made in the above described construction which provide the characteristics of this invention without departing from the spirit thereof, particularly as defined in the following claims.

That which is claimed is:

1. In a coin handling construction wherein a housing is provided with a cap for closing access to the interior of the construction, the improvement comprising locking means for securing said cap in place on said housing, said locking means including a rotatable rod positioned within said housing, first locking elements mounted on said cap, second locking elements mounted on said housing, each of said locking elements defining a surface for inter-engagement to thereby prevent separation of the cap and housing, and means defined by said rod for contact with said cap, said rod being rotatable between a first position in contact with said cap whereby said cap is maintained with said elements inter-engaged, and a second position whereat said cap is free for movement to disengage said elements.

2. A construction in accordance with claim 1 wherein said elements on said cap extend inwardly relative to said housing, inter-engagement of the cap and housing elements preventing separation in the direction of the inward extension, contact of said rod with said cap preventing shifting movement of the element in a direction approximately perpendicular to the direction of inward extension.

3. A construction in accordance with claim 1 including a lock for maintaining said rod in said first position.

4. A construction in accordance with claim 3 including a rotatable lock plug, said rod being connected as an extension of said lock plug.

5. A construction in accordance with claim 4 wherein said rod extends from said lock into contact with an opposite wall of said housing whereby said rod resists movement of said lock inwardly of said housing.

6. A construction in accordance with claim 1 wherein said rod defines an eccentric cross section, rotation of said rod operating to move rod engaging portions into contact with said cap.

7. A construction in accordance with claim 6 wherein said locking elements on said cap are engaged by said rod.

8. A construction in accordance with claim 7 including an enlarged rod portion for engagement with said housing, said rod portion limiting the extent of rotary movement of said rod.

9. A construction in accordance with claim 3 wherein said housing defines an opening for receiving said lock, and including a lock shield adapted to be secured at the outer extremity of said opening, and means for removing said lock shield for gaining access to said lock.

10. A construction in accordance with claim 9 wherein said lock shield defines a threaded central opening, insertion of a threaded tool in said central opening operating to drive said shield out of said opening.

11. A construction in accordance with claim 10 wherein said shield and said tool are provided with left-hand threads.

12. A construction in accordance with claim 3 wherein said locking rod assembly is received within an opening defined by said housing, said locking rod assembly including a lock plug and means for maintaining said plug against rotation within said housing opening.

13. A construction in accordance with claim 12 wherein said lock cylinder defines a flat, and a set screw engaging said flat whereby relative movement between the flat and set screw is prevented.

14. A construction in accordance with claim 13 wherein said set screw is located within said housing in a position covered by said cap when said cap is secured in place on said housing.

*15. In a coin handling construction wherein a housing is provided with a cap for closing access to the interior of the construction, the improvement comprising locking means for securing said cap in place on said housing, said locking means including a rotatable rod positioned within said housing, first locking elements associated with said cap, second locking elements associated with said housing, each of said locking elements defining an end portion having a surface for inter-engagement with another end portion surface to thereby prevent separation of the cap and housing, and means defined by said rod for contact with said elements, said rod being rotatable between a first position in contact with said elements whereat said cap is maintained with said elements inter-engaged, and a second position whereat said cap is free for movement to disengage said elements, said elements on said cap extending inwardly relative to said housing, inter-engagement of the end portion surfaces of the cap and housing elements locking the cap against separation from the housing in the direction of inward extension of said elements, contact of said rod with said elements preventing shifting movement of the cap transversely of said direction.*

*16. A construction in accordance with claim 15 including a lock for maintaining said rod in said first position.*

*17. A construction in accordance with claim 16 including a rotatable lock plug, said rod being connected as an extension of said lock plug.*

*18. A construction in accordance with claim 17 wherein said rod extends from said lock into contact with an opposite wall of said housing whereby said rod resists movement of said lock inwardly of said housing.*

*19. A construction in accordance with claim 15 wherein said rod defines an eccentric cross section, rotation of said rod operating to move rod engaging portions into contact with said elements.*

*20. A construction in accordance with claim 19 including an enlarged rod portion for engagement with said housing, said rod portion limiting the extent of rotary movement of said rod.*

*21. A construction in accordance with claim 16 wherein said housing defines an opening for receiving said lock, and including a lock shield adapted to be secured at the outer extremity of said opening, and means for removing said lock shield for gaining access to said lock.*

*22. A construction in accordance with claim 21 wherein said lock shield defines a threaded central opening, insertion of a threaded tool in said central opening operating to drive said shield out of said opening.*

*23. A construction in accordance with claim 22 wherein said shield and said tool are provided with left-hand threads.*

*24. A construction in accordance with claim 23 wherein said lock and rod assembly is received within an opening defined by said housing, said lock and rod assembly including a lock plug and means for maintaining said plug against rotation within said housing opening.*

*25. A construction in accordance with claim 24 wherein said lock cylinder defines a flat, and a set screw engaging said flat whereby relative movement between the flat and set screw is prevented.*

*26. A construction in accordance with claim 25 wherein said set screw is located within said housing in a position covered by said cap when said cap is secured in place on said housing.*

* * * * *